March 29, 1927.
D. A. CUTLER
1,622,860
RUBBER SOLE SHOE
Filed Sept. 22, 1926
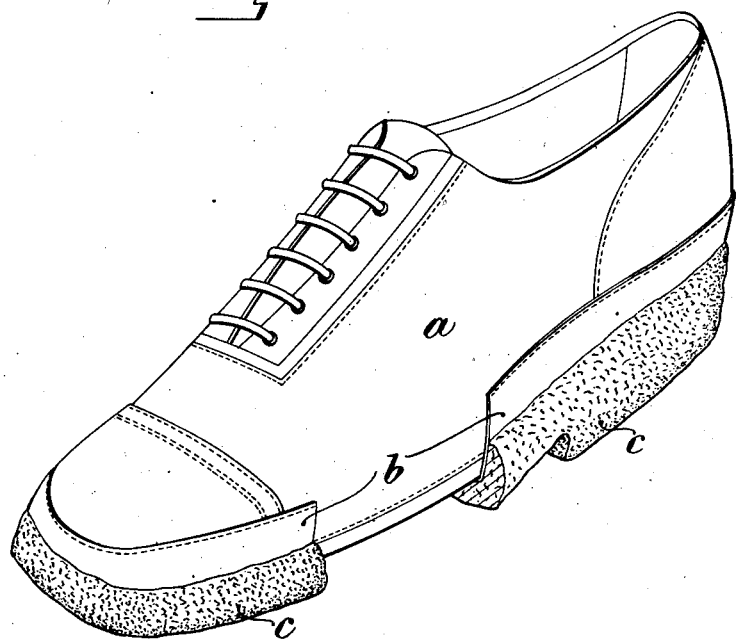
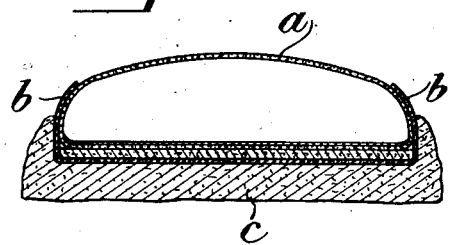

Patented Mar. 29, 1927.

1,622,860

UNITED STATES PATENT OFFICE.

DAVID A. CUTLER, OF WOLLASTON, MASSACHUSETTS, ASSIGNOR TO ALFRED HALE RUBBER COMPANY, OF ATLANTIC, MASSACHUSETTS, A CORPORATION OF MASSACHUSETTS.

RUBBER-SOLE SHOE.

Application filed September 22, 1926. Serial No. 136,911.

In the widely extended use of crepe rubber for the soles of sport shoes, the problem of securing such soles to uppers of rubber and the problem of securing such soles to uppers of canvas have been successfully solved, but hitherto no practicable and satisfactory method of securing such soles to uppers of leather has been found. By the present invention even that problem has now been solved and a way has been found by which such soles can be secured to uppers of leather without great expense and without sacrificing any of the advantages due to the use of true crepe rubber for this purpose. In accordance with the invention there is secured to the leather upper, preferably by stitching, a strip of fabric, which is then saturated with rubber latex and the sole is then secured thereto by the use of rubber latex in the manner heretofore disclosed.

The invention will be more fully explained hereinafter with reference to the accompanying drawing in which it is illustrated and in which:

Figure 1 is a view in elevation with parts broken away of a shoe with a leather upper, to which a sole of crepe rubber is secured.

Figure 2 is a detail sectional view of the toe portion of the shoe on a larger scale.

Except with respect to the manner of securing the sole to the leather upper, the shoe may be made in any desired manner. As shown in the drawing, the upper $a$, of any suitable leather, has secured about the bottom edge, preferably by stitching, a strip $b$ of duck or other suitable fabric, which is sufficiently wide to permit it to be lasted over, with a suitable width, say about one-half inch, above what, in an ordinary shoe, would be the line of the welt. This fabric strip is saturated with latex, to which the sole $c$, of unvulcanized crepe rubber is permanently secured by the use of rubber latex as, for example, in the manner heretofore explained, an integral and homogeneous union being formed between the unvulcanized crepe rubber and the rubber latex-treated fabric.

I claim as my invention:

A shoe having an upper of leather, a rubber latex-treated strip of material secured thereto and extending above the welt line, and a sole of unvulcanized crepe rubber secured to the rubber latex-treated strip of material with a permanent and homogeneous union of the latex.

This specification signed this 15th day of Sept. A. D. 1926.

DAVID A. CUTLER.